May 24, 1938.  J. J. MELLON  2,118,219

INDUCTION MOTOR DRIVING AND BRAKING SYSTEM

Filed June 13, 1936  2 Sheets-Sheet 1

INVENTOR.
JAMES J. MELLON.
BY *Slough and Canfield*
ATTORNEY.

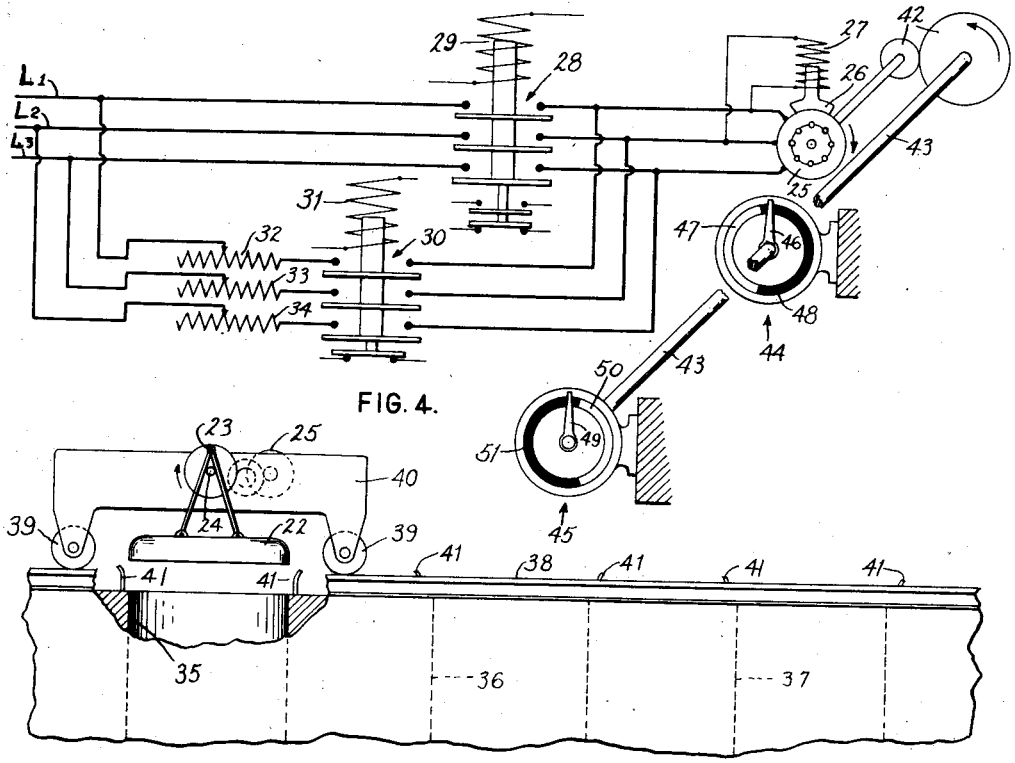
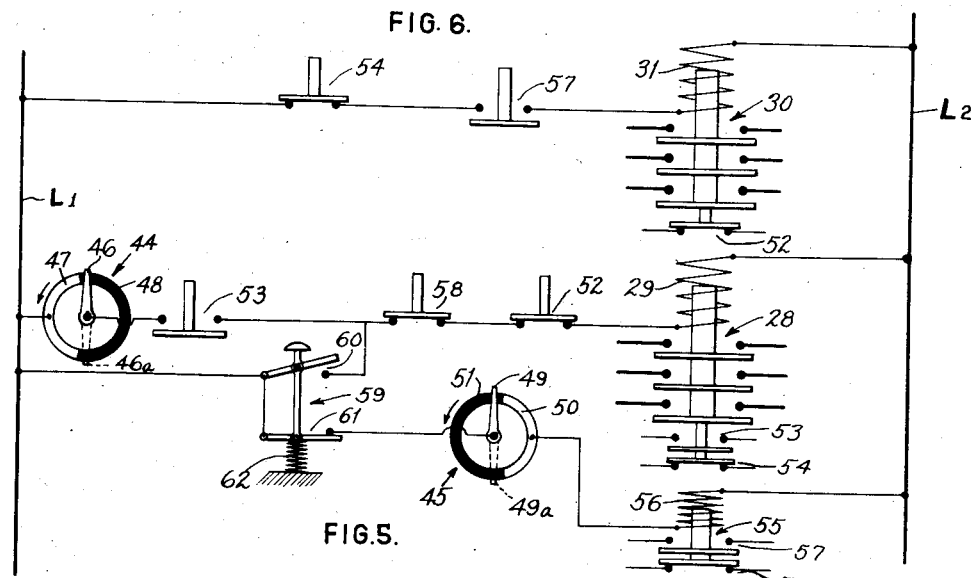

Patented May 24, 1938

2,118,219

UNITED STATES PATENT OFFICE 2,118,219

INDUCTION MOTOR DRIVING AND BRAKING SYSTEM

James J. Mellon, Cleveland, Ohio, assignor to The Clark Controller Company, Cleveland, Ohio, a corporation of Ohio Application June 13, 1936, Serial No. 85,073

9 Claims. (Cl. 172—179)

This invention relates to electric control systems for alternating current motors, particularly motors of the squirrel cage induction motor type and to the braking of such motors when subjected to overhauling loads.

My invention has particular application to squirrel cage induction motors when used to operate hoists and will be described as applied to this use herein, although as will become apparent hereinafter, my invention may be applied to motors driving overhauling loads of other kinds.

In direct current hoist motor practice, it is a relatively simple matter to brake a descending or overhauling load on the motor by closing a local circuit across the motor armature and absorbing the armature driving energy of the load by causing the rotating armature to generate electric current in the armature circuit, and regulating the braking effect by rheostat control of the generated current.

Such so-called dynamic braking is not practicable with alternating current motors, particularly of the squirrel cage induction type unless resource is had to the complication of energizing the stator with direct current for braking purposes.

It is therefore an object of this invention to provide:

An improved braking control system for alternating current motors of the squirrel cage type.

A control system for alternating current hoist or like motors in which power raising of the load, power lowering of the load and electric braking of the descending load may be accomplished in an improved manner.

An improved braking control system for alternating current motors arranged to operate hoists of the relatively short travel crank type.

A control system for alternating current motors operating short travel crank type hoists in which hoisting will automatically be stopped at the top of the lift, and lowering may be started by power, continued by electric braking, and stopped at the bottom of the lift in an improved manner.

Other objects will be apparent to those skilled in the art to which my invention appertains.

My invention is fully disclosed in the following description taken in connection with the accompanying drawings, in which:—

Figs. 4 and 5 are respectively a power circuit diagram and a control circuit diagram of a system embodying my invention in another form.

Fig. 6 is a diagrammatic view illustrating a type of hoist to operate which the system of Figs. 4 and 5 is more particularly adapted.

Figure 1:
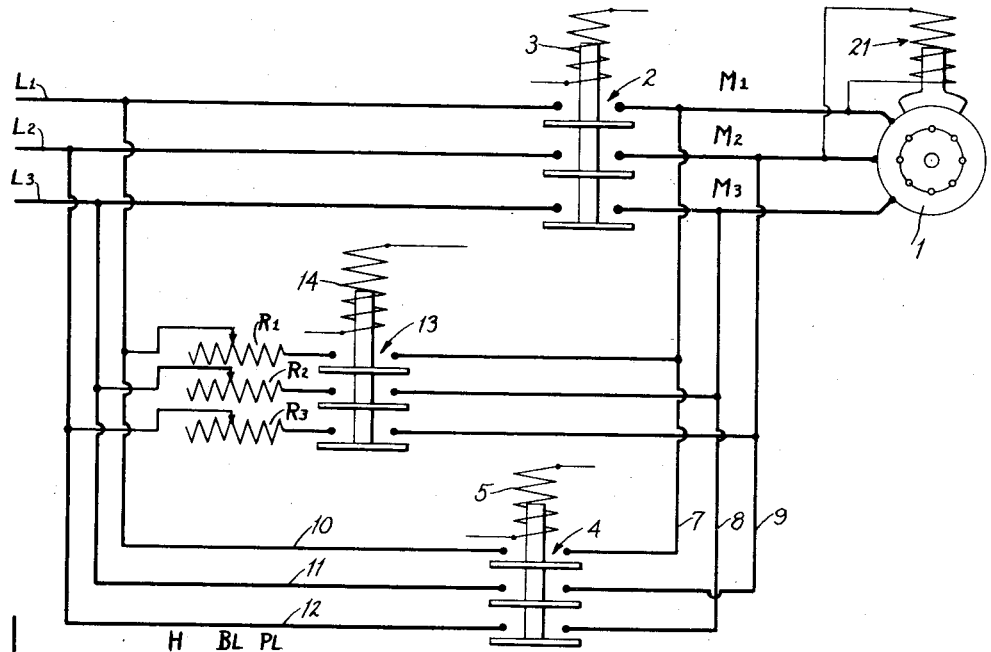
Fig. 1 and Fig. 2 are respectively a power circuit diagram and a control circuit diagram of a control system embodying my invention.
Figure 2:
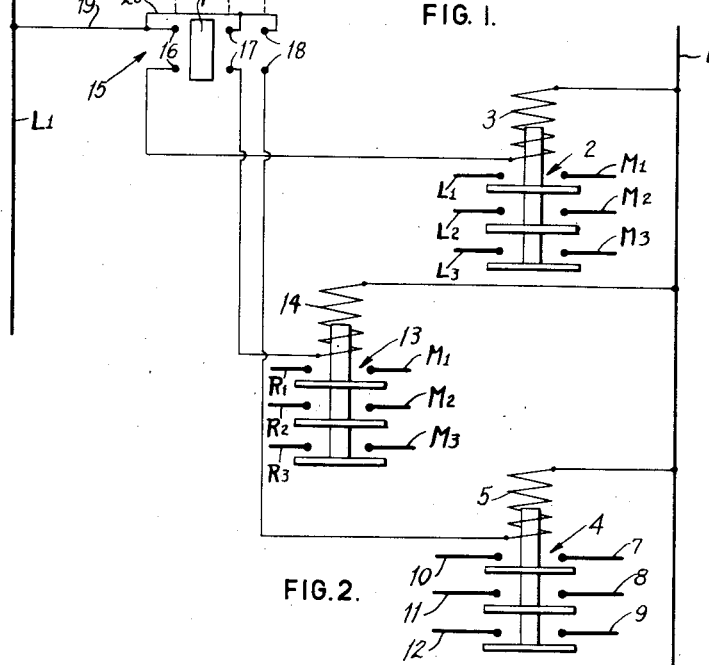
Figure 3:
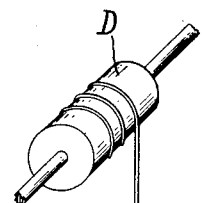
Fig. 3 is a diagrammatic view illustrating the type of hoist to operate which a motor may be controlled by the system illustrated diagrammatically in Figs. 1 and 2.

In connection with the embodiment of my invention illustrated in Figs. 1, 2 and 3, the type of hoist under consideration will be seen from Fig. 3 to be one in which a load G is constantly exerting torque on the drum D so that the load will immediately initiate lowering and overhauling of the driving motor at any point of elevation of the load. Lowering therefore may all be effected by the load or by power.

Another type of hoist will be described in connection with Figs. 4, 5 and 6.

Referring to Fig. 1, the hoist motor is shown at 1 as of the squirrel cage induction, 3 phase type supplied with alternating current from power mains L—1, L—2 and L—3.

A main switch illustrated generally at 2 and of the electro-magnetic type comprising a winding 3, is arranged to connect, when operated, the supply lines L—1, L—2 and L—3 respectively with motor mains M—1, M—2 and M—3 to supply the full line voltage to the motor 1 in the hoisting direction.

Another electro-magnetic switch shown generally at 4 and having a winding 5 is arranged to connect the motor mains M—1, M—2 and M—3 with the supply lines L—1, L—2 and L—3 through wires 7, 8 and 9, and 10, 11 and 12. And it will be observed that while the main M—1 is connected to the supply L—1, M—2 is now connected to L—3 and M—3 is now connected to L—2, so that the motor 1 is driven in the reverse direction, that is to say, is driven by power in the lowering direction.

A third switch shown generally at 13 and comprising a winding 14 is arranged so that when operated it will connect the mains M—1, M—2 and M—3 to the lines L—1, L—2 and L—3 through corresponding adjustable resistances R—1, R—2 and R—3; and it will be observed that the motor mains are connected to the lines to supply current to the motor in the hoisting direction.

The ohmic resistances R—1, R—2 and R—3 are thus connected in the stator circuits of the motor 1 and energize it with reduced voltage, causing it to develop torque insufficient to hoist or hold the load and permitting it to descend at reduced overhauling speed.

To operate the switches 2, 4 and 13 of Fig. 1, the control circuit diagram of Fig. 2 may be employed. In Fig. 2, the switches 2, 4 and 13 and their winding 3, 5 and 14 as illustrated in Fig. 1 are reproduced. A manual controller illustrated generally at 15 comprises a pair of stationary contacts 16 engageable by a drum T, upon rotation in one direction and pairs of contacts 17 and 18 engageable selectively by the drum T in the other direction.

Current is supplied to the upper ones of the pairs of contacts by wires 19 and 20 from a main L—1. The lower contact of the pair 16 is connected to one side of the winding 3, the other side being connected to a main L—2.

The lower contacts of the pairs 17 and 18 respectively are connected to one side of the windings 14 and 5, the other sides of these windings being connected to the main L—2.

To hoist, the drum T is turned in the direction to connect contacts 16; to lower by power the drum is moved to connect the contacts 18 and to lower by electric braking the drum is moved to connect the contacts 17.

I have found that an electric braking system of this construction and arrangement is particularly advantageous due to the simplicity thereof and to the ruggedness and durability of the squirrel cage type motor which may be used with it, when the load to be raised and lowered is of the same weight in every instance or varies from time to time relatively little and when the lift is short. In such cases the resistances R—1, R—2 and R—3 may be of fixed amount adjusted to the installation.

In operation, the operator would throw the drum T to the H or hoisting position to hoist the load. To lower it, he would throw the drum to the PL position to start the load downwardly by power; and then would move the drum T to the BL position to brake the descent of the load electrically; returning the drum T to the off position illustrated or to the left at the bottom of the descent. This last operation will, as will now be apparent, disconnect the mains M—1, M—2 and M—3 from the line whereupon the magnetic brake illustrated at 21 will automatically set to stop the descent or to hold the load at the desired lowered position.

The control system of Figs. 4 and 5 is more particularly applicable to the crank type of hoist one form of which is shown in Fig. 6. A crank end or crank pin 23 is rotatedly driven around a center 24 by a motor 25 geared thereto and the pin 23 is connected to a load 22, and as the pin 23 rotates around the center 24 the load will, in a complete revolution, be lifted and lowered a predetermined distance. The load 22 is illustrated in its uppermost position.

The power circuit for operating the motor 25, is illustrated in Fig. 4. The motor 25 is of the squirrel cake induction type and may be normally held by a brake 26 which will be released by winding 27 whenever power is supplied to the motor, from the supply mains L—1, L—2 and L—3. Power is supplied directly from the mains by an electro-magnetic switch 28 having a winding 29 to rotate the motor 25 in the direction to rotate the crank pin 23 in the direction of the arrow in Fig. 6. If the pin 23 is at the bottom of the lift, this will operate the motor to hoist. If the motor is stopped at the top of the lift, the pin 23 being on dead center with respect to the center 24, the load will develop no lowering torque and therefore to lower the load power must be applied again in the hoist direction.

After the load has started downwardly it develops torque and the motor 25 may electrically brake the descent by being reversely energized by a switch 30 having a winding 31 which connects the motor 25 to the lines L—1, L—2 and L—3 reversely and through ohmic resistances 32, 33 and 34. The load will now overhaul the motor 25 against the opposing torque which will oppose the descent and brake it and the amount of braking may be controlled by adjustably changing and fixing the resistances 32, 33 and 34.

As illustrated diagrammatically in Fig. 6, a hoist of this type may be utilized, as an illustrative use thereof, to lift, transport and replace the covers of soaking pits as commonly used in steel mills. A row of pits 35, 36 and 37 are disposed under a trackway 38 upon which the wheels 39—39 of a trolley carriage 40 run, the carriage supporting the crank 23 and motor 25 for driving it. The cover 22 is the load. The carriage 40 may be propelled along the trackway 38 by the usual trolley energized control and when positioned over a pit, the cover 22 may be lifted therefrom and in lifted position transported away from the pit and subsequently may be returned and lowered into covering position. Vertical guides 41—41 may be arranged on opposite sides of the pit mouth to vertically guide the cover 22 and to prevent lateral movements thereof by the lateral movement of the pin 23 as it goes around its circular path around the center 24.

A suitable power system for effecting the power and braking operation described above in connection with Fig. 6 is shown in Fig. 4, and a control system therefor in Fig. 5 and this will now be described. The motor 25 is geared as indicated at 42, diagrammatically, in Fig. 4, to a shaft 43 which rotates a pair of limit switches shown generally at 44 and 45.

The limit switch 44 comprises an arm 46 which rotates counter-clockwise over a circular contact 47 and insulation 48, the arrangement being such that in the off position shown, the arm 46 will be on the insulation 48 and will engage the contact 47 after a small counter-clockwise movement and will leave the contact 47 and move on to the insulation 48 at the diametrically opposite position.

The limit switch 45 comprises an arm 49 movable over a circular contact 50 and insulation 51, the arrangement being such that in the position shown, the arm 49 is on the insulation 51 and will engage the contact 50 just beyond the diametrically opposite position.

The limit switches 44 and 45 which are reproduced in the control system Fig. 5 are in the positions which they assume when the hoist crank pin 23 is at the bottom of the lift (which is of course diametrically opposite the position illustrated in Fig. 6).

Referring to Fig. 5, there are reproduced at 28 and 30 the switches 28 and 30 of Fig. 4 with a control switch 52, normally closed, added to the switch 30 and control switches 53 and 54, respectively normally open and normally closed, added to the switch 28. A third electro-magnetic switch 55 having a winding 56 is provided operating a normally open switch 57 and a normally closed switch 58.

The control switches 52, 53, 54, 57 and 58 on the switches 30, 28 and 55 are reproduced at other points in the control system Fig. 5 with the same reference characters thereon in order to simplify the diagrammatic showing. A master switch device preferably of the push button type is provided at 59 and comprises a normally open switch 60 and a normally closed switch 61, the said switches being normally retained in said positions by a spring 62.

In operation, the load 22 of Fig. 6 is at the bottom of the lift with the parts in the positions shown in Figs. 5 and 4. To raise the load, the push button device 59 is operated to close the switch 60 and open the switch 61. Current then flows from a supply main L—1 to the switch 60 and through the normally closed switches 58 and 52 to the line L—2 energizing the winding 29 of the switch 28 which operates, causing current to flow to the motor 25 as described above on closure of the switch 28, in Fig. 4. This drives the motor in the hoisting direction and the crank pin 23 of Fig. 6 starts to move from its foremost position upwardly. The closure of the switch 28 closes switch 53 and opens switch 54. The latter by being in the circuit of the winding 31 of the switch 30 prevents accidental operation of the switch 30.

The rotation of the motor 25 turns the shaft 43 and starts rotation of both arms 46 and 49 in the counter-clockwise direction as viewed in Fig. 5, the arm 46 quickly engaging the contact 47 which provides a parallel path around the switch 60 so that the device 59 may be released and moved to its normal position illustrated without restoring the switch 28.

The hoisting therefore will continue under control of the switch 44 until the arm 46 reaches its lowermost position at which it leaves the contact 47. This corresponds to the topmost positon for the crank pin 23 of Fig. 6, at which the hoist is at the top of the lift. Current to the winding 29 of the switch 28 is now broken by the arm 46 and the switch 28 is restored and the brake 26 of Fig. 4 will set to hold the load. The carriage 40 may now be propelled along the trackway 38 to dispose the pit door 22 at a point away from the pit 35 and subsequently when it is desired to lower the door over the pit and the carriage is returned to the position illustrated, the lowering operation will be performed as follows.

At this time the arms 46 and 49 are in the lower dotted line positions 46a and 49a respectively. To start the hoist lowering, the device 59 is again operated to energize the winding 29 of the switch 28 through the switch 60 as before, the motor 25 being rotated again in the same direction. This will carry the crank pin 23 over its dead center uppermost position and it will start on its descent and gravity will act on the load 22 to move the load downwardly. The initial lowering movement just described will move the switch arm 49 onto the contact 50. The power lowering therefore may now be discontinued by releasing the device 59 to de-energize the switch 28. Current will then flow from the line L—1 through the switch 61 and by way of arm 49 and contact 50 will energize the winding 56 of the switch 55 and will close the contacts 57 and open the contacts 58. Opening of contacts 58 prevents unintentional closure of the switch 28 and closure of the contacts 57 makes possible energization of the winding 31 of the switch 30, switch 54 in series with the switch 57 having been closed when switch 28 was restored. With switches 54 and 57 both closed, the winding 31 will be energized and the switch 30 will operate. Switch 30 upon operating opens switch 52, which prevents unintended operation of the switch 28. And the closure of switch 30 energizes the motor 25 reversely thru the resistors 32, 33 and 34 which as above described in connection Fig. 4 effects braking of the load overhauled motor. The braked descent of the load 22 continues until the crank pin 23 again reaches its starting point at the bottom of its stroke, and at this time the switch arm 49 has been rotated around to its uppermost position, shown in Fig. 5, at which it leaves the contact 50 which de-energizes the switch 55 opening switch 57 and thereby de-energizing the switch 30 causing it to be restored to break the motor current.

The arm 46 has also now been rotated to its original position Fig. 5 and the parts are in position to repeat the cycle just described.

In the operation just described it will be observed that upon momentarily pressing the push button device 59, the motor will hoist the load 22 from its bottom position to its top position by means of the crank hoist and will stop it at the top. By again momentarily pressing the push button device 59, the load will be power driven downwardly from its top position for a short distance and then will descend by gravity opposed by the braking action effected electrically in the motor.

Of course, as will be understood, if the push button device 59 is retained in operated position, the load will be hoisted by power and then will continue beyond the upper position, starting on the descent and will travel downwardly by power as long as the push button device is retained in operated position and upon releasing it, the electric braking will brake the descent of the load. My invention is not limited to the exact details of construction or of the systems of connections illustrated and described. Changes may be made within the scope and spirit of my invention without sacrificing its advantages and within the scope of the appended claims.

I claim:

1. In a control system for an induction motor connected to a load to be driven and which load is capable of moving and driving the motor, a source of polyphase electric current, a first set of circuits for connecting the respective phases of the primary winding of the induction motor to the respective phases of the supply source to supply power to the motor to cause it to drive the load, a first contactor means operable to open and close the said circuits, voltage reducing means, a second set of circuits for connecting the respective phases of the primary winding to the respective phases of the source through the voltage reducing means in the respective circuits to supply less than full source power to the motor in the load driving direction to permit the motor to be yieldingly driven by the load, a second contactor means operable to open and close the second set of circuits and contactor operating means by which the contactors may be singly and selectively operated.

2. In a control system for an induction motor connected to a load to be driven and which load is capable of moving and driving the motor, a source of polyphase electric current, a first set of circuits for connecting the respective phases of the primary winding of the induction motor to the respective phases of the supply source to supply power to the motor to cause it to drive the load, a first contactor means operable to open and close the said circuit, voltage reducing means, a second set of circuits for connecting the respective phases of the primary winding to the respective phases of the source through the voltage reducing means in the respective circuits to supply less than full source power to the motor in the load driving direction to permit the motor to be yieldingly driven by the load, a second contactor means operable to open and close the second set of circuits and a third set of circuits for connecting the respective phases of the motor primary winding to the respective phases of the power source to supply power to the motor to cause it to drive the load in the reverse direction, a third contactor means operable to open and close the third set of circuits and contactor operating means by which the contactors may be singly and selectively operated.

3. In a control system for an induction motor connected to a load to be driven and which load is capable of moving and driving the motor, a source of polyphase electric current, a first set of circuits for connecting the respective phases of the primary winding of the induction motor to the respective phases of the supply source to supply power to the motor to cause it to drive the load in the overhauling direction, contactor means operable to open and close the said circuits, voltage reducing means, a second set of circuits for connecting the respective phases of the primary winding to the respective phases of the source through the voltage reducing means in the respective circuits to supply reduced power to the motor in the reverse or load driving direction to permit the motor to be yieldingly driven by the load and contactor means operable to open and close the second set of circuits and contactor operating means by which the contactors may be singly and selectively operated.

4. In a control system for a squirrel cage induction motor operating a crank type hoist, a multiphase source of current, a first magnetic switch operable to connect the stator winding of the motor to the source to drive the hoist to raise the load, an operable control switch having contacts for momentarily connecting the winding of the first magnetic switch to the source to operate it, a first limit switch operable by rotation of the motor to establish a holding circuit for the magnetic switch winding after initiation of load raising movement of the motor and for de-energizing the winding of the first magnetic switch to restore it to stop the motor upon raising the load to the top of the lift, the operable control switch having contacts for bridging the limit switch to effect operation of the first magnetic switch to start lowering of the load, a second magnetic switch for reversely connecting the motor stator winding to the source through voltage reducing means in the respective phase circuits of the winding to develop torque in the motor yieldingly opposing overhauling lowering by the load, a second limit switch operable by rotation of the motor having contacts arranged to close after initiation of lowering movement and controlling, jointly with other contacts of the operable switch, energization of the winding of the second magnetic switch and arranged to be opened after completion of lowering movement to de-energize the winding of the second magnetic switch to restore it.

5. In a control system for an induction motor connected to a load which is capable of driving the motor, a source of electric power, a voltage reducing means, switch means and conductors controlled thereby by which the motor may be connected to the source and driven in the direction to drive the load and by which the motor may be connected to the power source through the voltage reducing means and driven in the direction to drive the load but at less than full source power and yieldingly permitting the load to overhaul and drive the motor in the reverse direction and by which the motor may be connected to the power source and driven in the direction to drive the load in the reverse direction.

6. In a control system for an induction motor connected to a load which is capable of driving the motor, a source of electric power, a voltage reducing means, switch means and conductors controlled thereby by which the motor may be connected to the source and driven in the direction to drive the load and by which the motor may be connected to the power source through the voltage reducing means and driven in the direction to drive the load but at less than full source power and yieldingly permitting the load to overhaul and drive the motor in the reverse direction and by which the motor may be connected to the source and driven in the direction to drive the load in the reverse direction.

7. In a control system for an induction motor of the type comprising a single set of polyphase primary windings and a rotor adapted to be connected to a load which is capable of driving the rotor, a source of alternating polyphase power, voltage reducing means, switch means and conductors controlled thereby by which the said primary windings may be connected to the source to drive the rotor in the direction to drive the load and at a range of speeds up to a possible predetermined synchronous speed, and by which the said windings may be connected to the power source through the voltage reducing means and in the direction to drive the load by the rotor but at less than full source power and yieldingly permitting the load to overhaul and drive the rotor in the reverse direction.

8. In a control system for an induction motor of the type comprising a field winding and adapted to be connected to a load to drive it in one direction and to be overhauled by it in another direction, a source of current, a first magnetic switch operable to connect the field winding of the motor to the source to drive the load, an operable control switch having contacts and cooperating with conductors for operating the first magnetic switch, a first limit switch operable by the motor to establish a holding circuit for the magnetic switch winding after driving of the load has been initiated by the motor and for de-energizing the winding of the first magnetic switch to restore it to stop the motor upon driving of the load through a predetermined distance, the operable control switch having contacts and cooperating conductors for effecting operation of the first magnetic switch to initiate movement of the load by the motor in the overhauling direction, a second magnetic switch for reversely connecting the motor field winding to the source through voltage reducing means to develop torque in the motor yieldingly opposing overhauling movement by the load, a second limit switch operable by the motor having contacts operable after initiation of the overhauling movement and controlling, jointly with other contacts of the operable switch, the winding of the second magnetic switch and arranged to be restored after completion of overhauling movement to de-energize the winding of the second magnetic switch to restore it.

9. In a control system for an induction motor connected to a load which is capable of driving the motor, a source of electric power, a voltage reducing means, switch means and conductors controlled thereby by which the motor may be connected to the source and driven in the direction to drive the load and by which the motor may be connected to the power source through the voltage reducing means and driven in the direction to drive the load but at less than full source power and yieldingly permitting the load to overhaul and drive the motor in the reverse direction.

JAMES J. MELLON.